Nov. 4, 1952        G. W. MESZAROS        2,617,087
CURRENT SUPPLY APPARATUS Filed July 6, 1949        4 Sheets-Sheet 1

FIG. 1a

INVENTOR.
GEORGE WILLIAM MESZAROS
BY
*G. F. Heuerman*
ATTORNEY.

Nov. 4, 1952 G. W. MESZAROS 2,617,087
CURRENT SUPPLY APPARATUS
Filed July 6, 1949 4 Sheets-Sheet 2

FIG. 1b

INVENTOR.
GEORGE WILLIAM MESZAROS
BY
G. F. Heuerman
ATTORNEY.

Patented Nov. 4, 1952

2,617,087

UNITED STATES PATENT OFFICE 2,617,087

CURRENT SUPPLY APPARATUS

George W. Meszaros, New York, N. Y., assignor to Bell Telephone Laboratories, Incorporated, New York, N. Y., a corporation of New York Application July 6, 1949, Serial No. 103,193

19 Claims. (Cl. 321—24)

1

The present invention relates to a rectifier type power supply system, and more particularly, to a system adapted to provide a constant current, unidirectional output from an alternate current source.

In many communication systems, it is important to supply a direct current, unvarying in magnitude, to a given load. It is often desirable that such power supply systems be of extreme dependability. It may also be desirable that they have a high order of constant current stabilization.

For example, in the case of remotely located equipment, such as repeater stations supplied from a distant source, a power supply of high dependability is often necessary. Remotely located repeater stations requiring such a supply are encountered in submarine cable applications. In applications of the latter and similar types, it is essential that the current supplied over the line to the remotely located repeater station shall be constant, with an order of stability higher than 1 per cent. In addition, dependability of the power supply will measure the efficiency of the communications system as a whole; provision should be made for emergencies arising from power supply failures.

According to the invention, two rectifiers which may be supplied from separate alternating current sources are connected for a choice of independent or parallel simultaneous operation. The load current is regulated by a thermionic discharge tube in series with the output of each rectifier, the resistance of the tube varying as the load current. Variable ratio transformer means control the alternating current input voltage of each rectifier; the ratio of the transformer for one of the rectifiers is controlled by its load current and the load current of the other rectifier. The object of the invention is to provide a direct current power supply with constant current output of high stability and operated from one or several sources of alternating current. Automatic protective circuit arrangements are included in the event of partial power supply system failures. Means are provided for intercoupling two parallel systems of the type according to a portion of the invention, and circuits used for manual, automatic and remote control for the operation of power supply systems.

The invention is more completely described in the following specification.

The invention will be explained with reference to the accompanying drawings, of which:

Figs. 1-a, 1-b and 1-c, interrelated show schematic electric diagrams of a circuit according to the invention;

Fig. 2 shows the interrelation of the various Figs. 1-a, 1-b and 1-c;

Fig. 3-a shows a simplified block schematic of the system as shown in Figs. 1-a, 1-b and 1-c; and Fig. 3-b shows a simplifier block schematic, a modification of the system in accordance with the invention.

Figure 1A:
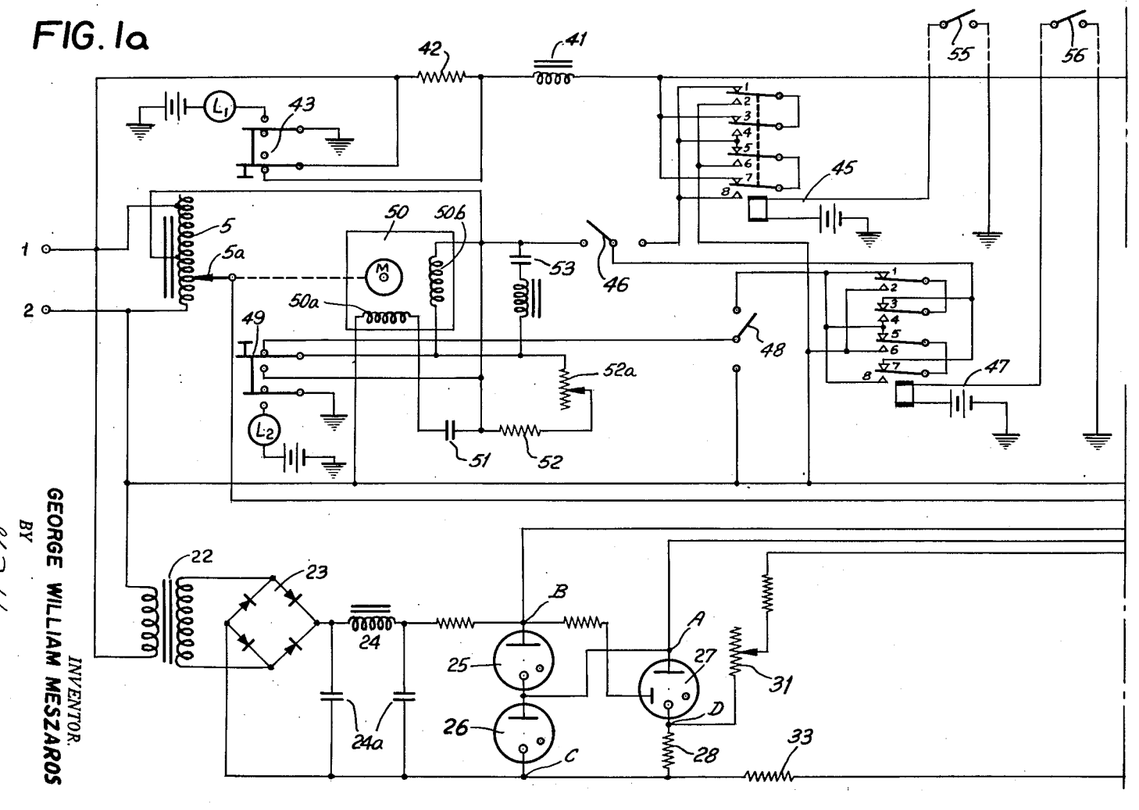
Figures 1B, 2:
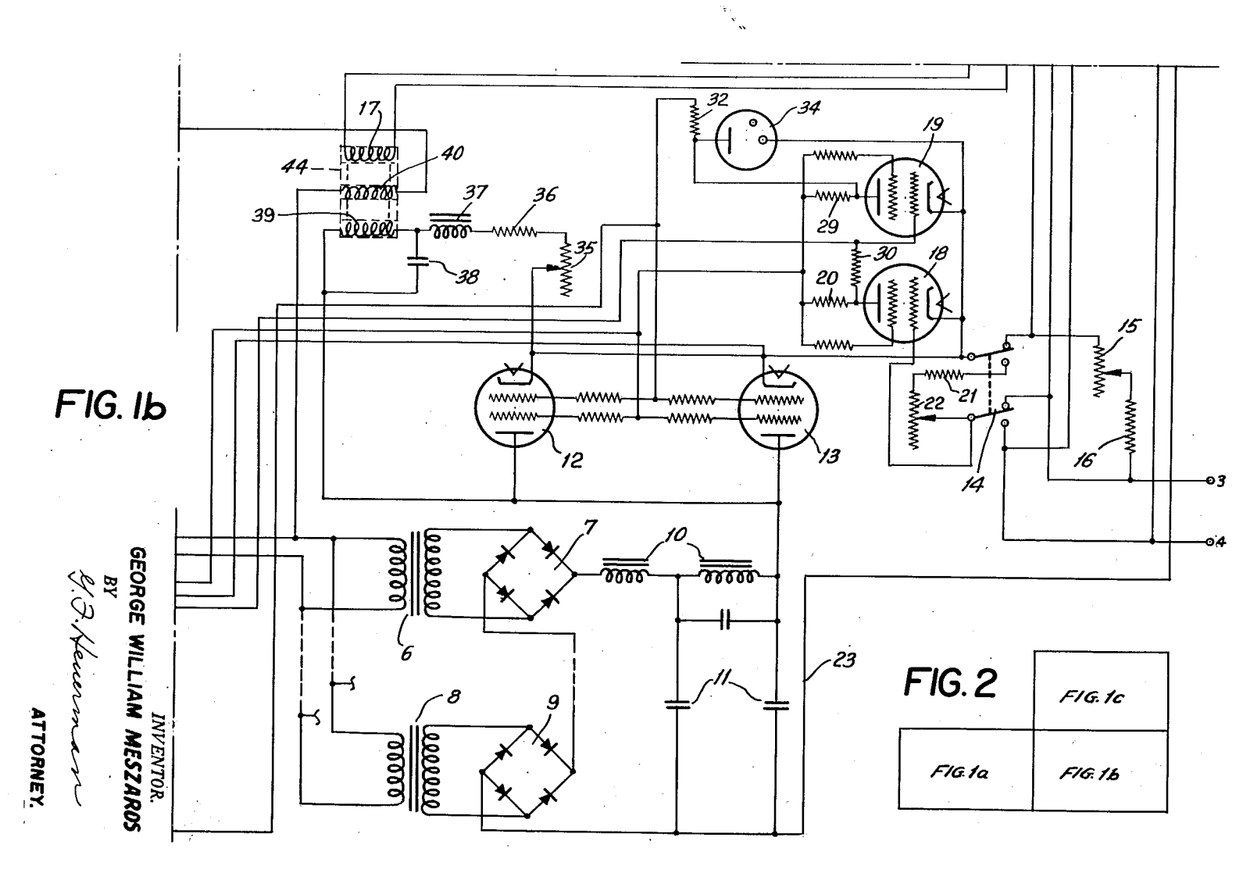

Referring now to the drawings in Fig. 1a, terminals 1 and 2 are supplied with a source of alternating current potential. It will be the general plan to regulate the magnitude of this voltage by means of a servocontrolled voltage regulating system, to provide the regulated voltage to a rectifying arrangement; and to couple the output of the rectifier through a current sensitive system to the load at terminals 3 and 4 in Fig. 1-b.

According to the invention, the alternating current supply passes from terminals 1 and 2 to an autotransformer 5, having both a variable tap 5-a and a fixed center tap. The output of the autotransformer is provided between the line connected to terminal 2 and variable tap 5-a of the autotransformer. This output is eventually supplied to rectifier arrangements, for example 7, and 9 in Fig. 1-b. Such rectifiers may be of the metallic disc type utilizing semiconductive materials such as selenium, copper oxide or barium titanate; or may employ thermionic discharge tubes.

An important parameter of rectifier design is the output voltage required. If a relatively low output voltage is needed, less than the maximum peak inverse voltage of the rectifier employed, the proper output voltage may be obtained by the use of a single rectifier arrangement, such as 7, and an appropriate selection of the turns ratio of the accompanying transformer 6. If an output voltage is required higher than the allowable peak inverse voltage of the rectifier employed, a group of rectifiers may be connected together. In Fig. 1-b, the individual rectifiers 7 and 9 are shown to be conventional bridge rectifiers, although other types could be used. To obtain the desired voltage, the output vertices of the rectifier bridges 7 and 9 are connected in series. The primary of the transformers 6 and 8 supplying the rectifiers 7 and 9 respectively are connected in parallel to the output of the autotransformer 5. While only two rectifiers 7 and 9 are shown, it would be possible to include any required number interposed in series between rectifiers 7 and 9 supplied from transformers having primaries in parallel with 6 and 8, thus providing any required output voltage.

The output of the rectifiers will be found to contain pulsations or "ripple" residual from the rectification of the alternating current. Such a ripple may be minimized or eliminated by utilization of an appropriate filter as shown in Fig. 1-b, composed of inductances 10 and capacitances 11. Other types of smoothing and filtering systems may be employed with equal success.

It has been stated that an object of the invention is to provide a direct current power supply with constant current output. In order that a constant current output may be maintained, two paralleled thermionic discharge tubes 12 and 13 are utilized as regulators; their anode-cathode circuits are connected in series with the output of the filter and rectifier. The polarity of the rectifier must be such as to provide a positive potential to the anodes of the series-regulating tubes 12 and 13 with respect to their cathodes.

Neglecting, temporarily, the manner of deriving the control-grid cathode voltage for the series-regulating tubes, the rectifier output passes from the multipled cathodes of the series-regulating tubes 12 and 13 to a switch 14. Switch 14 is provided for test purposes; with the switch armatures in the upper position, the outputs of the rectifiers and series-regulating tubes are connected to the load at terminals 3 and 4. This connection is made from the cathodes of the regulating tubes, through the upper armature of switch 14 to its associated outer contact and through a rheostat 15 and a resistance 16 to one of the load terminals 3. When the armatures of switch 14 are in the lower or test position, the cathodes of the series-regulating tubes will be connected through the upper armature of switch 14 to its associated inner contact and to resistance 21 and rheostat 22. Elements 21 and 22 are used for the purpose of providing a test voltage input to an amplifier tube 18 of the rectifier supply system without applying the rectifier output to the load.

Figure 1C:
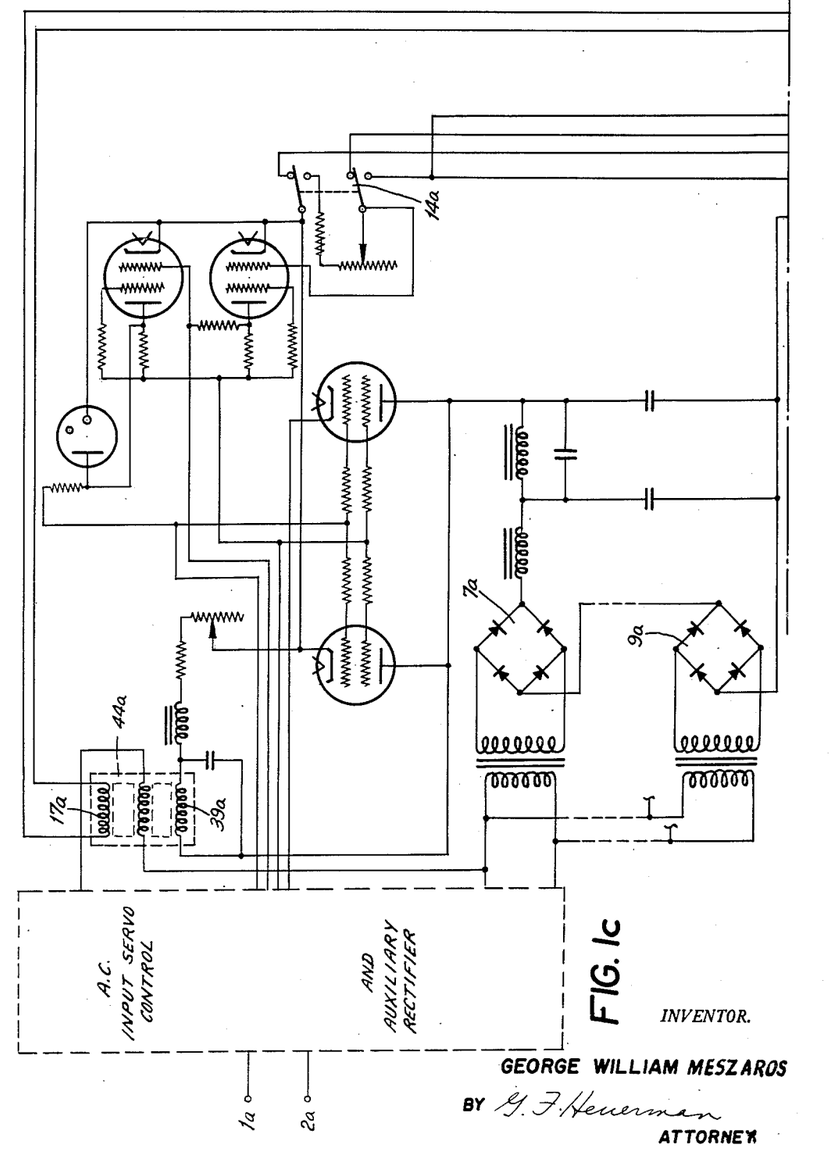

Irrespective of the position of test switch 14, output lead 23 of the rectifier is connected through coil 17-a in Fig. 1-c, and thence returns to terminal 4 and the load.

It has been shown that the load current passes through rheostat 15 and resistance 16 when the armature of switch 14 is in the upper or operative position. A resulting voltage will be developed across elements 15 and 16 proportional to the flow of current therein. According to the invention, the voltage developed by the flow of current through these elements is amplified and thence supplied to the control grid of the series-regulator tubes 12 and 13, modifying the apparent resistance presented by the series-regulator tubes and compensating for the changes in load current. The voltage drop experienced by rheostat 15 and resistance 16 is presented on one side from the fixed end of rheostat 15, through the outer contact and associated upper armature of switch 14, to the cathode of an amplifier tube 18. The lower terminal of resistance 16 is connected through the inner contact and associated lower armature of switch 14, to the control grid of amplifier tube 18. The voltage drop experienced by elements 15 and 16 is therefore presented to the control grid-cathode circuit of amplifier tube 18.

Thermionic discharge tubes 18 and 19 comprise a two-stage, direct coupled amplifier. The operations of direct coupled amplifiers generally are closely associated with their sources of operating potentials; these must necessarily be discussed to allow understanding of the amplifier operation. An auxiliary rectifier for supplying operating potentials for the control equipment is shown in Fig. 1-a. A transformer 22 has its primary connected to the source of alternating current at terminals 1 and 2; its secondary is connected to the input of the auxiliary rectifier. A bridge rectifier 23 is shown for the sake of illustration, but any convenient type of rectifier may be used. The output vertices of rectifier 23 are connected to a filter composed of an inductance 24 and capacitances 24-a; the filter is utilized to minimize ripple in the output of the rectifier 23.

The output of the rectifier is then passed to a bank of voltage regulating tubes, shown in Fig. 1-a as comprising two series connected gaseous discharge regulating tubes 25 and 26. Voltage regulating tube 26 is, in turn, connected in cascade to a third gaseous regulating tube 27; the cathode of the latter is connected through resistance 28 to the cathode of regulating tube 26. The voltage regulators employed in the auxiliary rectifier system may be of any convenient type. However, in the system as shown, the gaseous discharge tubes are of the type having a designated striking voltage and a substantially constant voltage drop characteristic within operative limits irrespective of the voltage supplied thereto. Such tubes commonly employ neon or many other of the inert gases for their ionic medium.

Voltage regulator tubes 25, 26 and 27 are adapted to provide three discrete output voltage levels. Assuming that a reference level is established at point A, the junction of voltage regulator tubes 25 and 26, the polarity of the rectifiers is such as to establish a positive voltage from the reference level to the anode of regulator tube 25, point B. A negative voltage with respect to the reference level A will be found at the cathode of voltage regulator tube 26, point C. Because of the parallel connection of voltage regulator tube 27 in series with resistance 28 across the regulator tube 26, a negative voltage of smaller magnitude than that existing between A and C will be found between the reference level A and the cathode of voltage regulator tube 27 or point D.

Referring once again to direct coupled amplifier tubes 18 and 19 in Fig. 1-b, the cathodes of both amplifier tubes are connected to the reference level A. Thus, point A will be positioned potentially with the fixed end of rheostat 15 in accordance with the connections previously described. Analysis of the load current passing through rheostat 15 and resistances 16 will indicate that a negative voltage will be developed at the control grid of amplifier tube 18 with respect to its cathode; assuming that the load current through 15 and 16 increases, this control grid voltage becomes increasingly negative.

Considering the other voltages applied to the amplifier tubes, the positive potential of point B is supplied to the anodes of amplifier tubes 18 and 19 through resistances 20 and 29. As a result, current flows from the cathode to the anode of amplifier tube 18 in accordance with its control grid-cathode voltage which in turn has been shown as dependent upon the load current. To facilitate the discussion of amplifier operation, the effect of an increasing load current will be considered; such an increase would decrease the anode current of amplifier tube 18, reducing the voltage drop incurred across anode resistance 20. The anode-cathode voltage of amplifier tube 18 will therefore be increased. Resistances 30 and 31 are connected together in series and extend from the anode of tube 18 to reference level D. The voltage across 30 and 31 will be the sum of the anode-cathode voltage of tube 18 and the voltage difference between levels A and D, across gas regulator tube 27. A portion of the anode voltage change is reflected from across resistor 31 to the grid of the succeeding direct coupled amplifier tube 19.

A negative bias is applied to the control grid-cathode circuit of tube 19 from point D and also through variable resistance 31. This negative bias voltage combines with the load current activated anode voltage of amplifier tube 18 to control the relative operating level of amplifier tube 19 at an appropriate control grid voltage level. Adjustment of 31 can be employed to provide a fine adjustment of the threshold of amplifier operation; for example, increasing the negative bias voltage limits the signal supplied to tube 19 from amplifier stage 18. In operation, the assumed rise in the anode voltage of amplifier tube 18 provides a less negative control grid-cathode voltage at amplifier tube 19, the voltage at point D remaining constant. The anode-cathode current of amplifier tube 19 depends upon its control grid-cathode voltage; the less negative condition of the control grid of 19 increases the anode current flow through resistance 29 and depresses the anode-cathode voltage of amplifier tube 19. Resistances 32 and 33 are in series from the anode of tube 19 to the point of level C. The voltage across 32 and 33 will be the sum of the anode-cathode voltage of tube 19 and the voltage from levels A to C. A portion of the anode voltage change is reflected from across resistor 33 to the control grids of series-regulator tubes 12 and 13, the cathodes of the amplifier tubes 18 and 19 being connected to the cathodes of the series-regulator tubes. A negative bias from point C is also supplied through resistance 33 to the control grids of the series-regulator tubes.

Assuming that the negative bias voltage supplied through resistance 33 remains constant, the depression of the anode-cathode voltage of amplifier tube 19 will mean increasingly negative control grid-cathode voltage at regulator tubes 12 and 13. This increasingly negative control-grid voltage provides an increased plate resistance in the series-regulator tubes which, in turn, tends to reduce the load current.

It is to be remembered that the original condition assumed in the analysis of the direct coupled amplifier operation was that the load current passing through elements 15 and 16 had increased; it may now be seen that the resistance of the series-regulator tubes has increased, in turn compensating for the increase in load current, and restoring it to more nearly the desired constant value. It follows that an assumption of decreasing load current will reverse the polarity of the events in the amplifiers and compensate accordingly.

Direct coupled amplifiers, in general, tend to be troubled by slow drifts in supply potentials, as such variations are amplified in the same manner as the desired signal; such amplifiers cannot discriminate between desired and undesired voltage changes. The voltage-regulator tubes previously described are therefore important in eliminating uncertain amplifier operation resulting from changing supply potentials. Critical especially, is the control grid-cathode bias voltage of tube 19; this voltage is protected from change by voltage-regulator tubes 26 and 27 operating in cascade.

Another voltage-regulator tube 34 is provided between the anode and cathode of amplifier 19. This voltage-regulator tube is normally in an unfired condition, and fulfills a protective function. As the control grid voltage of the series-regulator tubes 12 and 13 depends in part upon the anode-cathode voltage of tube 19, unless the latter is maintained at a given maximum, the grid voltage of the series regulators may become less negative to the point of allowing a dangerous output current rise. Such a voltage in excess of the maximum increases the voltage across voltage-regulator tube 34 sufficiently to cause it to fire, and the anode-cathode voltage of 19 would be thus limited. However, the control grid voltage of the series-regulator tube cannot become less negative than the predetermined protective amount resultant from the firing of voltage-regulator tube 34. As a further example, if voltage-regulator tube 27 should fail, the negative bias supplied to the control grid of amplifier 19 would reach a more negative value, determined largely by the potential of point C. This would unduly increase the anode-cathode voltage from the resultant reduction in the voltage drop of the anode resistance 29, firing voltage-regulator tube 34; the voltage supplied to the control grid of series-regulator tubes 12 and 13 would therefore be controlled to the predetermined safe value.

In short, any circuit failure causing the anode-cathode voltage of the final amplifier tube 19 to exceed the predetermined amount will result in firing of the voltage tube regulator 34; the control grid of the series-regulator tube will thus be maintained at a minimum negative value, protecting both the series-regulator tubes and the load from a dangerously increasing load current.

While the series-regulator tubes and their associated direct coupled amplifiers would provide regulation of the load current to a substantially constant value, the range of load currents over which compensation may thus be affected is limited by the operating parameters of the series-regulator tubes and of the direct coupled amplifiers. As the series-regulator tubes approach the limit of operation, accuracy of the regulation will be affected. Supplementing the constant current action of the series-regulator tubes and to provide a wider operating range and increased constant current accuracy, a further portion of the circuit is shown, called generally the "alternating current input servocontrol."

It has been stated that the main rectifiers as 7 and 9 will be supplied through an autotransformer 5 from the alternating supply line. It will be the function of the alternating current input servocontrol to adjust the voltage input of the rectifiers by positioning the variable tap 5–a on the autotransformer in accordance with the load current of the series-regulator tubes 12 and 13. The series-regulator tubes will have an optimum point of operation, i. e., a point located near the center of the operating range of series-current control. Such an optimum point will result in a given value of voltage drop across the regulator tubes, for as the plate resistance of the series-regulator tubes varies, the anode-cathode current of the series-regulator tubes will remain essentially constant.

The voltage drop found across the series-regulator tubes 12 and 13 is impressed in series with a rheostat 35, a resistance 36 and a filter comprising inductance 37 and capacitance 38, to the winding 39 of a saturable reactor 44. This saturable reactor has three windings 39, 40 and 17 which induce three discrete magnetic fluxes. Winding 40, called the impedance winding, has one end connected to the alternating supply line terminal 2; its free side is connected in series with a ballast reactor 41 and occasionally with resistance 42 to alternating supply line terminal 1. It will be shown that in normal operation, resistance 42 is short-circuited through the lower armature and outer contact of a limit switch 43; in effect, this places ballast reactor 41 and impedance winding 40 of the saturable reactor 44 in series across the alternating current supply line.

When series-regulator tubes 12 and 13 are at the point of optimum operation, the ballast reactor 41 and impedance winding 40 of the saturable reactor are arranged to have substantially equal impedance; the junction of the latter two will then represent an electrical mid-point of the alternating current supply. The circumstance of equal impedance of 40 and 41 arises through control of the reluctance of the core of reactor 44 exerted through the control winding 39. The reactance presented by the impedance winding 40 is determined, in part, by the position on the magnetization or hysteresis curve at which the magnetic core of the saturable reactor 44 is to be found; this, in turn, is dependent upon the magnitude of the direct current flowing through the control winding 39. By proper adjustment of the rheostat 35 and of the parameters of the saturable reactor, the voltage drop developed by the series-regulator tubes 12 and 13 can be caused to induce a current flow through the control winding 39 providing the equal impedance of elements 40 and 41 at the optimum operating point of the series-regulator tubes 12 and 13.

The alternating current supplied through the impedance winding 40 will induce a certain amount of alternating currents in the control winding 39. These currents, of power supply frequency and of harmonics resulting from the non-linearity of the saturable reactor, would affect the series-regulator tubes 12 and 13 adversely. To avoid such an effect, a low-pass filter, comprising inductance 37 and capacitance 38, is interposed to prevent the return of these alternating voltages to the series-regulator tubes; the filter will not otherwise affect the unidirectional control voltages transmitted from the series-regulator tubes to the control winding 39 as previously described.

Referring again to Fig. 1-a, a relay 45 is shown in the unenergized condition. The junction of 40 and 41 is connected to contacts 3 and 7 of relay 45, through the associated armatures to contacts 1 and 5 of the same relay. Assuming that switch 46 is closed to its right-hand contact, the aforesaid junction is connected to contacts 3 and 7 of relay 47, shown also in the unenergized condition. Contacts 3 and 7 of relay 47 are, in turn, connected through their associated armatures to contacts 1 and 5 of the same relay and, in turn, to the upper contact of switch 48. Assuming that the armature of switch 48 is closed in its upper position, the aforesaid junction is then connected through the upper outer contact of a limit switch 49 and its associated armature, to one side of winding 50-b of motor 50.

Motor 50 is a two-phase electric motor having its two windings connected in quadrature. Winding 50-a of the motor is connected between one side of the alternating current supply line terminal 2 and through capacitance 51 to the fixed tap of autotransformer 5. The fixed tap of the autotransformer 5 is substantially an electrical mid-point of the alternating supply line. The phase of the current flowing through winding 50-a will depend, inter alia, upon the magnitude of capacitance 51. Winding 50-b is connected through the switching arrangements previously described to the junction of 40 and 41; the other side of winding 50-b is connected to the fixed tap of autotransformer 5.

The saturable reactor 44 has been described as maintained at a condition at which the junction of 40 and 41 provides an electrical mid-point of the incoming alternating supply line whenever the series-regulator tubes are at the point of optimum operation. This optimum operating condition will be considered as corresponding to the quiescent point of the servocontrol system. Where the quiescent point is achieved, winding 50-b of motor 50 will not be energized as both sides of the winding are connected to an electrical mid-point of the alternating current supply line, and no current flows through winding 50-b. When winding 50-a alone is energized, motor 50 will not rotate.

When series-regulator tubes 12 and 13 are at an operating point other than the optimum, currents of varying magnitude flow through control winding 39 of the saturable reactor. In turn, the reactance presented by impedance winding 40 varies in accordance with the operating point of the series-regulator tubes; the junction of reactors 40 and 41 will no longer locate an electrical mid-point of the alternating current supply. Whether the junction will be located electrically above or below the mid-point, i. e., closer to alternating current supply terminal 1 or to terminal 2, depends upon which side of the optimum point of operation the series-regulator tubes 12 and 13 are functioning. The transition of the junction from the electrical mid-point of the alternating current supply causes a voltage to appear across winding 50-b, ultimately depending in phase and magnitude upon the displacement from optimum at which the series-regulator tubes are functioning. Motor 50 will rotate when winding 50-b is energized, the direction of rotation depending upon the relative phase of the voltage applied to winding 50-b. The phase of winding 50-a will remain unchanged in any event; capacitance 51 is used to adjust the phase of the voltage applied to winding 50-a, providing proper energizing currents therefor. A mechanical linkage is provided between motor 50 and the variable tap 5-a of autotransformer 5.

Assuming that the series-regulator tubes 12 and 13 are operating at a point other than optimum, indicating, for example, that a rise in load current is experienced, the motor 50 is employed to drive the variable tap 5-a of autotransformer 5 to a point closer to alternating current supply terminal 2, reducing the alternating current input to rectifier transformers 6 and 8, and ultimately the output voltage from the rectifiers. The reduced output voltage will reduce the load current. When the load current is reduced once more to the optimum point of operation of series-regulator tubes 12 and 13, the servosystem finds itself again in the quiescent condition and motor 50 will stop. Similarly, a drop in load current causes motor 50 to rotate in an opposite direction. By virtue of the phase of the voltage applied to winding 50–b, the variable tap 5–a will approach a point closer to alternating current supply terminal 1. This will increase the voltage provided to the transformers 6 and 8, increasing the output voltage of the rectifier and ultimately increasing the load current to compensate for the load current decrease. Again, the series-regulator tubes will reach the optimum position of operation; the servosystem will again become quiescent.

By virtue of the servosystem described, the net operation of the series-regulator tubes may be confined to a range close to the optimum operating condition; a condition other than optimum will be obtained only while the servocontrol system is in the process of providing the correction provided.

Means must be provided to control the operation of the system according to the invention. In Fig. 1–a, several circuits are shown for proper control of the system. Rheostat 52–a and resistance 52 are connected in series across winding 50–b of the motor. The voltage presented to winding 50–b depends in magnitude upon the displacement of the series-regulator tubes from the optimum condition; the current flowing through winding 50–b, however, is dependent upon the magnitude of the paralleling resistance 51 and 52.

A series filter comprising capacitance 53 and inductance 54 is also incorporated across winding 50–b. Third harmonics of the power line frequency may be induced in winding 40 and transmitted to winding 50–b of the motor. To eliminate these third harmonics, which may be great enough to overheat the windings of the motor 50, the filter is employed.

Limit switches are provided to stop the motor 50 when the variable tap 5–a of autotransformer 5 reaches either end of its permissive travel. Limit switch 43 operates at the upper end of travel through suitable mechanical linkage. When the upper end is reached, the lamp L₁ will light. Operation of switch 43 will, in addition, insert resistance 42 in series with the alternating current supply line to ballast reactor 41. Insertion of resistance 42 shifts the electrical position of the junction of reactors 40 and 41, with regard to the alternating current supply line, reducing or cancelling the signal voltage applied from the junction of these reactors to winding 50–b, thus assisting in slowing the motor 50 as the variable tap 5–a reaches the end of the winding, and preventing impact with mechanical stop arrangements.

If a signal is received from the series-regulator tubes having a polarity tending to return the variable tap 5–a to a lower position, the motor will respond; the effect of resistor 42 will be such that it will aid in providing a signal lowering the variable tap position received from the series-regulator tubes. Thus, the system may restore itself to normal operation if an appropriate signal is received at the high limit position.

Considering the lower limit switch 49, when the variable tap approaches the lowest point on the autotransformer winding, a mechanical linkage operates switch 49, displacing the armatures to the lower position. This displacement causes lamp L₂ to light and provides a short-circuit across winding 50–b of the motor through the upper armature and inner contact of switch 49. This short-circuit is tantamount to a dynamic breaking of the motor, and assists in preventing impact of variable tap 5–a with the mechanical stop. In the case of the low limit switch 49, no subsequent signal from the series-regulator tubes can restore the system to automatic operation; the variable tap 5–a must be reset manually.

Switch 46 provides manual or automatic operation. When its armature is in the right-hand position, the system operates automatically in the manner previously described. However, when the switch is thrown to the left-hand position, the fixed tap of autotransformer 5 is connected through switch 46, relay 47, switch 48 and limit switch 49 to the activated terminal of winding 50–b. Thus, winding 50–b will remain unenergized and signals developed by the voltage drop across the series-regulator tubes 12 and 13 will not be transmitted to motor 50, and the position of the motor and variable tap 5–a may be changed by hand. Under the latter conditions, the servosystem will not seek the quiescent point as motor 50 will not respond to the signals, except if relay 47 should be operated. When switch 46 is thrown back to the right-hand or automatic position, the motor 50 will be once again controlled to the quiescent point by the voltage drop across the series-regulator tubes 12 and 13, unless the lower limit switch 49 is operated.

The armature of "decrease" switch 48 is normally in the upper position and is non-locking when operated to engage the lower contact. When the lower contact is engaged, however, motor 50 will drive the variable tap 5–a to a lower position until the low limit switch 49 is tripped. When the armature of switch 48 is held manually in the lower position, connecting the winding 50–b to one side of the alternating current supply, neither signals derived from the voltage drop of the series-regulator tubes 12 and 13 nor the positions of relays 45 and 47 affect the operation of motor 50. The purpose of switch 48 is to release the rectifier system from the load and provide shutdown of this supply.

Remotely located means such as 55 and 56 may be employed to close the coil circuits of relays 45 and 47 respectively. It has been found desirable to close circuits 55 at a point of abnormally low load current or rectifier output voltage, and such circuit closing may be made automatic through the use of a current sensitive relay, for example. Closing of circuit 55 will cause the motor 50 to drive variable tap 5–a to the low position, locking out the system by operation of low limit switch 49. Energization of relay 45 will have the effect described only if switch 46 is in the right-hand or automatic position. While the motor is being turned manually to remove the variable tap 5–a from the position engaging the low limit switch 49, operation of relay 45 resulting from a low load current or voltage condition will not interfere with the manual operation as switch 46 would be in the left-hand or manual position. Thus, even if the circuit 55 was closed, representing a low load current or voltage condition, the resetting of the motor and variable tap 5–a would not be affected.

Similarly, it has been found desirable to close circuit 56 in response to an abnormally high load current or load voltage, and this response may also be made automatic. The closing of switch 56 will energize relay 47, driving the motor 50 and the variable tap 5–a to a lower position and eventually tripping the low limit switch 49 and thus locking out the system. Such a turndown would occur irrespective of the position of switch 46, as a high current or high voltage condition would not ordinarily be encountered while the motor and variable tap were being manually removed from the low limit condition. While circuits 55 and 56 have been described as responsive to low and high output currents and voltages, the switches may be made responsive to other external conditions in known manners.

In order to increase the dependability of the power supply unit described, a paralleling second power supply is employed. Referring now to Fig. 1-c, a system is shown duplicating the system described with reference to Figs. 1-a and 1-b; that part of the circuit comparable to the parts contained in Fig. 1-a being indicated by the enclosure marked "alternating current input servocontrol and auxiliary rectifier." The operation of the duplicate system is identical with the description given of the circuits shown in Figs. 1-a and 1-b. In normal operation, both the system described with reference to Figs. 1-a and 1-b and the comparable system shown in Fig. 1-c may operate simultaneously. The output of the rectifiers of both systems can be supplied simultaneously or individually to the load; both systems may be designed to carry the entire load independently in the event of a failure or removal of one of the systems from the load. In addition, the alternating current supplies fed to each of the two paralleling systems may be independent, thus insuring continuity of service even in the event of failure of one of the alternating supplies. If desired, a common alternating supply may be employed.

When both rectifier systems are in simultaneous operation, being coupled to the line through switches 14 and 14-a, the currents supplied to the load by the systems respectively should be approximately equal. To assure such equal sharing of the load, the third or "load-sharing" winding 17 of saturable reactor 44 and the comparable winding 17-a of the paralleling system shown in Fig. 1-c are employed. Load-sharing winding 17 is connected to have therein a current flow proportional to the output current of the cooperating rectifier system. In Figs. 1-b and 1-c, load-sharing winding 17 is in series with the lead from an output vertice of rectifier 9-a. Similarly, load-sharing winding 17-a of saturable reactor 44-a corresponding to saturable reactor 44 is connected in series with the lead from the output vertice of rectifier 9. The magnetic fluxes developed in the respective reactors 44 and 44-a by the current flow through windings 17 and 17-a are polarized by virtue of the relative connection of the windings, to provide a flux opposed to the flux developed respectively by the control windings 39 and 39-a. If, for example, the output current from rectifiers 7-a and 9-a increases, the current through winding 17 will increase correspondingly. This increase in current produces a change in flux opposed to the direct current flux developed by the control winding 39. The reduction of direct current flux is analogous to a reduction in the voltage drop across the series-regulator tubes 12 and 13 in so far as the net effect upon the saturation of the core of saturable reactor 44 is concerned. The increase of current through winding 17 will operate the servocontrol system in a direction increasing the rectifier input voltage, and thereby increasing the output voltage from associated rectifiers 7 and 9. Thereupon, a greater part of the load will be carried by the rectifiers 7 and 9 with respect to the cooperating rectifiers 7-a and 9-a. Similarly, an undue increase in the output current of rectifiers 7 and 9 increases the current flow through windings 17-a of saturable reactor 44-a. This will result ultimately in an increase in the output voltage of rectifiers 7-a and 9-a, compensating for the undue current increase. It can be shown that reduction in load current in either one of the rectifier systems will reduce the output of the cooperating rectifier, maintaining an equal sharing of the load.

Figure 3A:
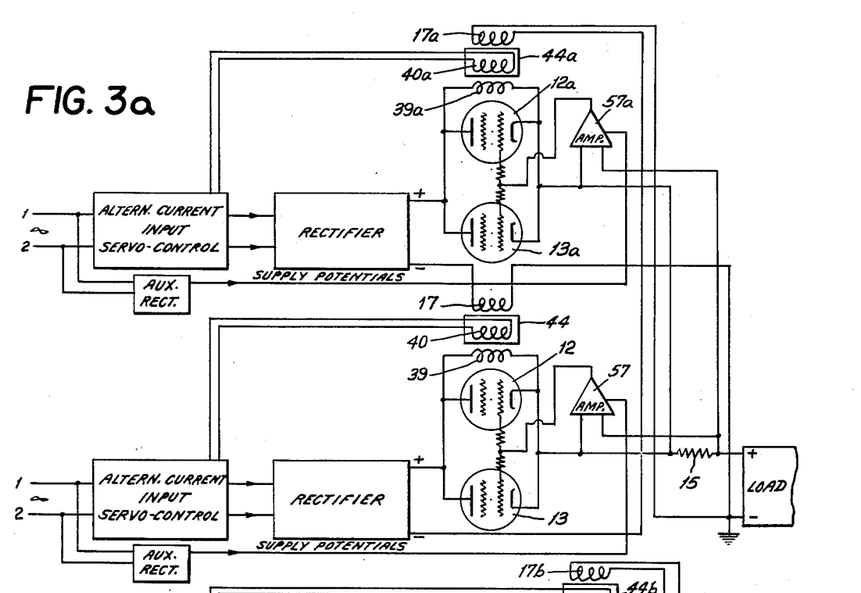

A simplified diagram of the circuits described with reference to Figs. 1-a, 1-b and 1-c is shown in Fig. 3-a. The alternating current input servocontrol, the auxiliary rectifier and the main rectifier are shown in block form. The operational connections of the series-regulator tubes 12 and 13; 12-a and 13-a are indicated, together with saturable reactors 44 and 44-a. The direct coupled amplifiers are shown symbolically as 57 and 57-a. In this previously described circuit, it has been a necessary assumption that the anodes of the series-regulator tubes 12 and 13; 12-a and 13-a would be connected to the positive output terminal of the rectifier, thus allowing the necessary cathode-anode electron flow through the series-regulator tubes. The useful load supplied by a system according to the invention may often be a cable or repeater having specific polarity requirements with respect to ground. In order that such polarities may properly be supplied to the load, the series-regulator tubes may be required to be located in the negative lead, in lieu of the positive lead as shown.

Figure 3B:
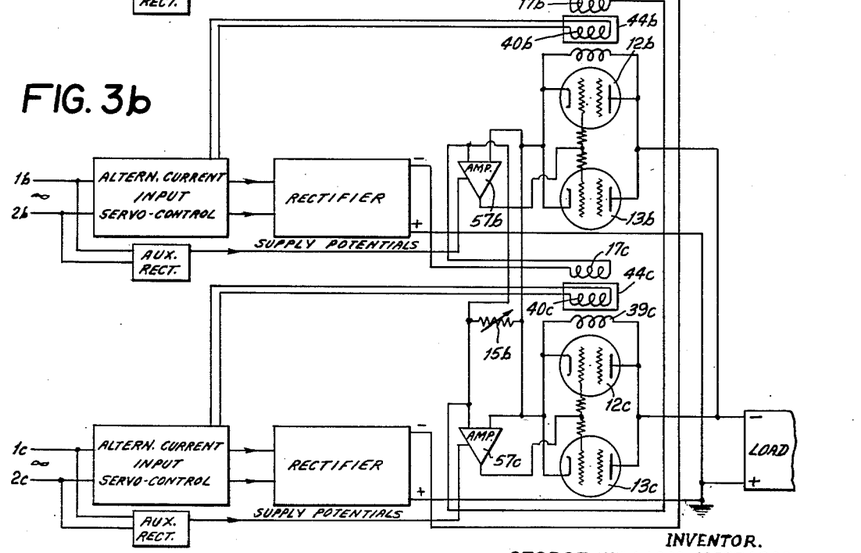

Referring to Fig. 3-b, one possible method of including series-regulator tubes 12-b and 13-b; 12-c and 13-c in the negative lead, is shown. For the successful operation of the direct coupled amplifiers contained in 57-b and 57-c in the manner described with reference to 18 and 19 of Fig. 1-b, the cathodes of these amplifiers must be located at an electrical potential close to the cathodes of the series-regulator tubes. In addition, the grid-cathode circuit of the direct coupled amplifiers must measure the voltage drop across a resistance in series with the load current. Thus, the cathodes of the series-regulator tubes corresponding to 12-b and 13-b; 12-c and 13-c are to be connected in the negative leads of their respective rectifiers, and at the same time are to be connected to the cathodes of the direct coupled amplifiers 57-b and 57-c and a series resistance through which the load current must flow. One circuit meeting these requirements utilizes a single series resistance 15-b in common with the cathodes of the series-regulator tubes 12-b and 13-b; 12-c and 13-c, as shown in Fig. 3-b. This, in effect, places the anode-cathode circuits of all the series-regulator tubes in parallel whenever both rectifiers are connected to the load. It has been found that such a paralleled connection tends to display unduly poor load distribution unless the load compensating windings 17-b and 17-c are used. Windings 17-b and 17-c are in series with the negative leads as shown.

Switching of the rectifiers and series-regulator tubes in Fig. 3-b to remove one or the other of the paralleling circuits from the line is not shown, but test switches and circuit arrangements similar to those described with reference to Figs. 1-a, 1-b and 1-c may be successfully employed in removing one or the other of the paralleling systems from the load while maintaining continuity of service. The alternating current input servocontrol, rectifiers and the remainder of the circuits shown in block form in Fig. 3–b operate as described with reference to Figs. 1–a, 1–b and 1–c.

It is obvious that the scope of the invention is not limited to the specific embodiments described, and that the invention may be employed in arrangements other than those given by way of example.

What is claimed is:

1. In combination, a source of alternating current, a first rectifier to supply a first rectified current to a load, a second rectifier to supply a second rectified current to the said load, first and second input servocontrols to supply the source of alternating current to the first and second rectifiers respectively in accordance with a signal control voltage, means including a first saturable reactor opposedly responsive to the said first and second rectified current for deriving the signal control voltage for the said first input servocontrol, and means including a second saturable reactor opposedly responsive to the said second and first rectified currents for deriving the signal control voltage for the said second input servocontrol, whereby the relative amplitudes of the said first and second rectified currents are maintained at substantially constant and equal values.

2. In combination, first and second sources of alternating current, a first rectifier to supply a first rectified current to a load, a second rectifier to supply a second rectified current to the said load, first and second input servocontrols to supply the first and second sources of alternating current to the first and second rectifiers respectively in accordance with a signal control voltage, means including a first saturable reactor opposedly responsive to the said first and second rectified current for deriving the signal control voltage for the said first input servocontrol, and means including a second saturable reactor opposedly responsive to the said second and first rectified currents for deriving the signal control voltage for the said second input servocontrol, whereby the relative amplitudes of the said first and second rectified currents are maintained at substantially constant and equal values.

3. In a constant current rectifier power supply system, a source of alternating voltage, first and second rectifiers, a load circuit, first and second load current regulating means coupling respectively said rectifiers to the said load circuit each including, a reactor having a saturable magnetic core and variable impedance winding, means to derive a magnetic flux of given direction in the core of the said reactor responsive to the load current supplied from the respective said rectifier and means to provide a variable coupling between the said source of alternating current and the respective rectifiers in accordance with variations of the impedance winding of the said reactor, and means to derive magnetic flux having a direction opposed to the said given direction of magnetic flux in the core of the reactors included in the said first and second regulating means responsive to the output current of the said second and first rectifiers respectively.

4. In a constant current rectifier power supply system, a source of alternating current, first and second rectifiers, a load circuit, first and second regulating means coupling respectively said rectifiers to the said load circuit each including, a plurality of series-regulating thermionic discharge tubes having parallel electron paths in series with the output of the respective said rectifier to the said load; means to modulate the electron path of the said series-regulating tubes in accordance with the output current of the said respective rectifier; a reactor having a saturable magnetic core and a variable impedance winding, means to derive a magnetic flux of given direction in the core of the said reactor responsive to the voltage across the said series-regulating tubes; and variable means to modify the magnitude of the said source of alternating current for supply to the respective rectifiers in accordance with variations of the impedance winding of the said reactor, and means to derive magnetic flux having a direction opposed to the said given direction of magnetic flux in the core of the reactors included in the said first and second regulating means responsive to the output current of the said second and first rectifiers respectively.

5. In a constant current rectifier power supply system, a source of alternating current, first and second rectifiers, a load circuit, first and second regulating means coupling respectively said rectifiers to the said load circuit each including, a plurality of series-regulating thermionic discharge tubes having parallel electron paths in series with the output of the respective said rectifier to the said load; a resistive element in series with the output of the said rectifier and the said load; a direct coupled amplifier having its input coupled to the said resistive element, means to modulate the electron path of the said series-regulating tubes in accordance with the output of the said direct coupled amplifier; a reactor having a saturable magnetic core and variable impedance winding, means to derive a magnetic flux of given direction in the core of the said reactor responsive to the voltage across the said series-regulating tubes; and variable means to couple the said source of alternating current to the respective rectifiers in accordance with variations of the impedance winding of the said reactor, and means to derive magnetic flux having a direction opposed to the said given direction of magnetic flux in the core of the reactors included in the said first and second regulating means responsive to the output current of the said second and first rectifiers respectively.

6. In a constant current rectifier power supply system according to claim 5 an output switching circuit comprising first and second switching means coupling the said first and second load current regulating means in multiple and discretely to the said load selectively, the said resistive element being interposed between the said switching means and the said load.

7. In a constant current rectifier power supply system, a source of alternating current, a first rectifier, a load circuit, regulating means coupling the output of the said first rectifier to the said load circuit including, a plurality of series-regulating thermionic discharge tubes having parallel electron paths in series with the output of the said first rectifier; a resistive element in series with the output of the said first rectifier and the said load; a direct coupled amplifier having its input coupled to the said resistive element, means to modulate the electron path of the said series-regulating tubes in accordance with the output of the said direct coupled amplifier; a saturable reactor having a variable impedance winding and first and second direct current control windings; means to couple the first control winding of the said saturable reactor in parallel with the said series-regulating tubes; and variable means to couple the said source of alternating current to the said first rectifier in accordance with variations of the impedance winding of the said saturable reactor, a second rectifier adapted to supply a direct current to the said load; and means to couple the second control winding of the said saturable reactor in series with the output circuit of the said second rectifier.

8. In a constant current rectifier power supply system, a source of alternating current, first and second rectifiers, a load circuit, first and second regulating means coupling respectively the output of the said rectifiers to the said load circuit each including, a plurality of series-regulating thermionic discharge tubes having parallel electron paths in series with the output of the respective said rectifier to the said load; a resistive element in series with the output of the respective said rectifier and the said load; a direct coupled amplifier having its input coupled to the said resistive element; means to modulate the electron path of the said series-regulating tubes in accordance with the output of the said direct coupled amplifier; a saturable reactor having a variable impedance winding and first and second direct current control windings; means to couple the first control winding of the said saturable reactor in parallel with the said series-regulating tubes; and variable means to couple the said source of alternating current to the said respective rectifiers in accordance with variations of the impedance winding of the said saturable reactor; and means to couple the second control windings of the said saturable reactors included in the said first and second regulating means in the output of the said second and first rectifiers respectively.

9. In a direct current rectifier power supply system adapted to have a predetermined constant current output, a source of alternating current, a first rectifier, a load circuit, regulating means coupling the said first rectifier to the said load circuit including, a plurality of series-regulating thermionic discharge tubes having paralleled electron paths in series with the output of the said first rectifier to the said load and having a given voltage drop at the predetermined constant current output; a resistive element in series with the output of the said first rectifier and the said load; a direct coupled amplifier having its input coupled to the said series connected resistive element; means to modulate the electron path of the series-regulating tubes in accordance with the output of the said direct coupled amplifier; a saturable reactor having a variable impedance winding and first and second direct current control windings; means to couple the first control winding of the said saturable reactor in parallel with the said series-regulating tubes; means to derive a voltage from the impedance winding of the said saturable reactor, said voltage having a phase and magnitude dependent upon the electrical displacement of the voltage drop of the said series-regulating tubes from the said given value; and means to control the source of alternating current supplied to the said first rectifier in accordance with the phase and magnitude of the said derived voltage, a second rectifier adapted to supply a direct current to the said load, and means to couple the second direct current control winding of the said saturable reactor collateral with the said regulating means in series with the output of the said second rectifier.

10. In a direct current rectifier power supply system adapted to have a predetermined constant current output, a source of alternating current, a first and a second rectifier, a load circuit, first and second regulating means coupling respectively the said first and second rectifiers to the said load circuit, each of said first and second regulating means including, a plurality of series-regulating thermionic discharge tubes having parallelled electron paths in series with the output of the respective said rectifier to the said load and having a given voltage drop at the predetermined constant current output; a resistive element in series with the output of the respective said rectifier and the said load; a direct coupled amplifier having its input coupled to the said series connected resistive element; means to modulate the electron path of the series-regulating tubes in accordance with the output of the said direct coupled amplifier; a saturable reactor having a variable impedance winding and first and second direct current control windings; means to couple the first control winding of the said saturable reactor in parallel with the said series-regulating tubes; means to derive a voltage from the impedance winding of the said saturable reactor, said voltage having a phase and magnitude dependent upon the electrical displacement of the voltage drop of the said series-regulating tubes from the said given value; and means to control the source of alternating current supplied to the respective said rectifiers in accordance with the phase and magnitude of the said derived voltage, means to couple the second direct current control winding of the said saturable reactor collateral with the said second regulating means in series with the output of the said first rectifier, and means to couple the second direct current control winding of the said saturable reactor collateral with the said first regulating means in series with the output of the said second rectifier, the second direct current control windings of each of the said saturable reactors having a direction opposing the magnetomotive force of the first direct current control windings of the said saturable reactors.

11. A direct current rectifier power supply system having a predetermined constant current output comprising, first and second sources of alternating current, a first rectifier, a load circuit, a plurality of series-regulating thermionic discharge tubes having cathodes, grids and anodes, said series-regulating tubes having their anode-cathode circuits connected to each other in parallel and together in series with the output of the said rectifier to the said load and having a given voltage drop at the predetermined constant current output, a resistive element in series with the output of the said rectifier and the said load, a direct coupled amplifier having its input connected across the said series connected resistive element, means to couple the output of the said direct coupled amplifier to the grid-cathode circuit of the said series-regulating discharge tubes, a saturable reactor having a saturation controlled variable impedance winding and two direct current control windings, means to couple one of the control windings of the said saturable reactor in parallel with the anode-cathode circuits of the said series-regulating tubes, a variable tap transformer interposed between the said first source of alternating current and the said first rectifier, a motor responsive in operation to the phase and magnitude of the voltage supplied thereto, said motor being linked mechanically to the variable tap of the said transformer, means to supply a voltage to the said motor, said voltage being derived from the variable impedance winding of the said saturable reactor and having a phase and magnitude dependent upon the electrical displacement of the voltage drop of the said series-regulating tubes from the said given value, a second rectifier coupled to the said second source of alternating current to supply direct current to the said load, and means to connect the free direct current control winding of the said saturable reactor in series with the direct current supply of the said second rectifier.

12. In a direct current rectifier power supply system according to claim 11 a control circuit of the said motor comprising relay means to limit the travel of the variable tap of the said transformer, and selective switching coupled between the said motor and the said supply voltage of the said motor whereby the said motor may be manually and electrically coerced in rotation.

13. A direct current rectifier power supply system having a predetermined constant current output comprising, a source of alternating current, a first and a second rectifier, a load circuit, first and second regulating means coupling respectively the said first and second rectifiers to the said load circuit, each of said first and second regulating means including, a plurality of series-regulating thermionic discharge tubes having cathodes, grids and anodes, said series-regulating tubes having their anode-cathode circuits connected to each other in parallel and together in series with the output of the respective said rectifier to the said load and having a given voltage drop at the predetermined constant current output; a resistive element in series with the respective outputs of the said rectifiers and the said load; a direct coupled amplifier having its input connected across the said series connected resistive element; means to couple the output of the said direct coupled amplifier to the grid-cathode circuit of the said series-regulating discharge tubes; a saturable reactor having a saturation controlled variable impedance winding, first and second direct current control windings; means to couple the first control winding of the said saturable reactor in parallel with the anode-cathode circuits of the said series-regulating tubes; a variable tap transformer interposed between the said source of alternating current and the respective said rectifiers; a motor responsive in operation to the phase and magnitude of the voltage supplied thereto, said motor being linked mechanically to the variable tap of the said transformer; and means to supply a voltage to the said motor, said voltage being derived from the variable impedance winding of the said saturable reactor and having a phase and magnitude dependent upon the electrical displacement of the voltage drop of the said series-regulating tubes from the said given value, means to couple the second direct current control winding of the saturable reactor collateral with the said first regulating means in series with the output of the said second rectifier, the said second direct current control winding of the saturable reactor collateral with the said second regulating means coupled in series with the output of the said first rectifier, and flux of the said second direct current control windings having a direction opposing the magnetomotive force of the first direct current control windings of the said saturable reactors.

14. In a rectifier power supply having an alternating current source, first and second rectifiers cooperating to supply direct current of a predetermined maximum value to a load, and having means including a saturable reactor associated with each one of said rectifiers to control the magnitude of the alternating current source applied to the cooperating rectifier in accordance with the output currents of the said respective rectifier, the combination comprising a resistive element, a plurality of series-regulating thermionic discharge tubes having cathodes, grids and anodes, said thermionic discharge tubes having their anode-cathode circuits coupled to each other in parallel and together in series with the said resistive element in the output of each one of the said rectifiers, a direct coupled thermionic discharge tube amplifier having its input connected to the said resistive element, means to couple the output of the said direct coupled amplifier to the grid-cathode circuit of the said series-regulating tubes, and a gaseous discharge tube coupled in parallel with the output of the said direct coupled amplifier and having a striking voltage value at which the grid-cathode circuit of the said series-regulating tube is maintained at a maximum corresponding to the maximum predetermined direct current value.

15. In a rectifier power supply having an alternating current source, first and second rectifiers cooperating to supply respectively first and second direct currents to a load, and having means including a plurality of series-regulating thermionic discharge tubes; a series resistance; and a direct coupled amplifier associated with each of said rectifiers to control the magnitude of the alternating current source applied to the said first and second rectifiers in accordance with their respective output currents, the combination comprising a reactor having a magnetically saturable core, first and second direct current control windings and a variable impedance winding, means to derive a first unidirectional control voltage having a magnitude responsive to the direct load current of one of the said rectifiers, means to supply said first direct current control voltage to the first direct current control winding of the said reactor in a given direction of resultant magnetic flux, means to derive a second direct current control voltage proportional to the direct load current of the free one of the said rectifiers, means to apply the said second direct current control voltage to the second direct current control winding of the said reactor in a direction of magnetic flux opposed to the said given direction of resultant magnetic flux, and servocontrol means to vary the magnitude of the alternating current source supplied to the one of the said rectifiers in accordance with the varying impedance of the said reactor.

16. In combination, a first and a second space current device each having a space current path, a first rectifier for rectifying current from an alternating-current supply source and for supplying a first rectified current through the space current path of said first space current device to a load, a second rectifier for rectifying current from an alternating-current supply source and for supplying a second rectified current through the space current path of said second space current device to said load, means responsive to the load current for controlling the resistance of the space current paths of said first and second space current devices, means responsive jointly to said first rectified current and to the voltage across the space current path of said second space current device for controlling one of said rectified currents and means responsive jointly to said second rectified current and to the voltage across the space current path of said first space current device for controlling the other of said rectified currents.

17. In combination, a first and a second space current device each having a space current path, a first rectifier for rectifying current from an alternating-current supply source and for supplying a first rectified current through the space current path of said first space current device to a load, a second rectifier for rectifying current from an alternating-current supply source and for supplying a second rectified current through the space current path of said second space current device to said load, means responsive to the load current for controlling the resistance of the space current paths of said first and second space current devices, and means responsive jointly to said first rectified current and to the voltage across the space current path of said second space current device for controlling said second rectified current.

18. In combination, a first and a second space current device each having a space current path, a first rectifier for rectifying current from an alternating-current supply source and for supplying a first rectified current through the space current path of said first space current device to a load, a second rectifier for rectifying current from an alternating-current supply source and for supplying a second rectified current through the space current path of said second space current device to said load, means responsive to the load current for controlling the resistance of the space current paths of said first and second space current devices, means responsive to said first rectified current for controlling in part at least the voltage of the alternating current impressed upon said second rectifier, and means responsive to said second rectified current for controlling in part at least the voltage of the alternating current impressed upon said first rectifier.

19. In combination, a first and a second space current device each having a space current path, a first rectifier for rectifying current from an alternating-current supply source and for supplying a first rectified current through the space current path of said first space current device to a load, a second rectifier for rectifying current from an alternating-current supply source and for supplying a second rectified current through the space current path of said second space current device to said load, means responsive to the load current for controlling the resistance of the space current paths of said first and second space current devices, a first and a second saturable reactor each having a first and a second saturating winding to which currents are supplied for controlling the impedance of the saturable reactor, means for connecting said first saturating windings in current paths connected across the space current paths of said first and second space current devices, respectively, means for supplying said first rectified current to the second saturating winding of said second saturable reactor, means for supplying said second rectified current to the second saturating winding of said first saturable reactor, and means responsive to the impedances of said first and second saturable reactors for controlling the voltages of the alternating currents impressed upon said first and second rectifiers, respectively.

GEORGE W. MESZAROS.

REFERENCES CITED

The following references are of record in the file of this patent:

UNITED STATES PATENTS

| Number | Name | Date |
|---|---|---|
| 1,661,841 | McDonald | Mar. 6, 1928 |
| 2,038,505 | Winograd | Apr. 21, 1936 |
| 2,040,748 | Le Roy | May 12, 1936 |
| 2,112,051 | Schmidt | Mar. 22, 1938 |
| 2,137,098 | Schilling | Nov. 15, 1938 |
| 2,155,090 | Janetschke | Apr. 18, 1939 |
| 2,288,016 | Myers | June 20, 1942 |
| 2,291,349 | Schmidt | July 28, 1942 |
| 2,349,633 | Meyers | May 23, 1944 |
| 2,434,947 | Meszaros et al. | Jan. 27, 1948 |
| 2,495,783 | Sorensen | Jan. 31, 1950 |
| 2,519,670 | Langbeer | Aug. 22, 1950 |